Feb. 2, 1954
W. L. HENDERSON
2,668,250
COMBINED LOW REACTANCE AUTOTRANSFORMER
AND BALLAST REACTOR
Filed Jan. 7, 1950
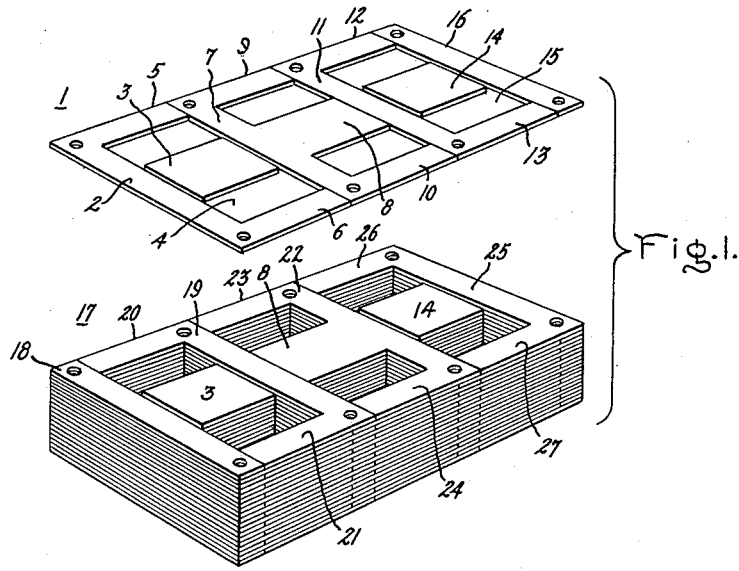
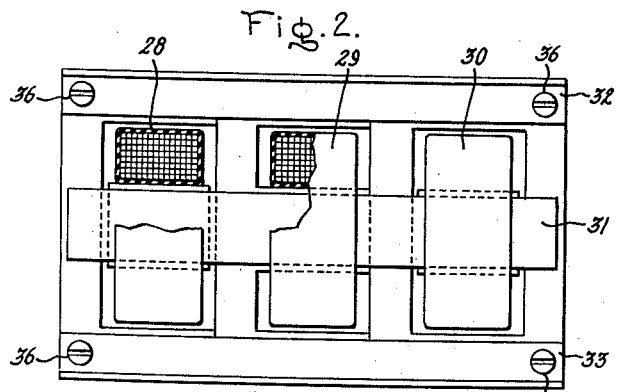
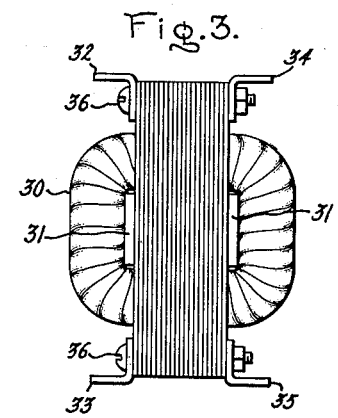
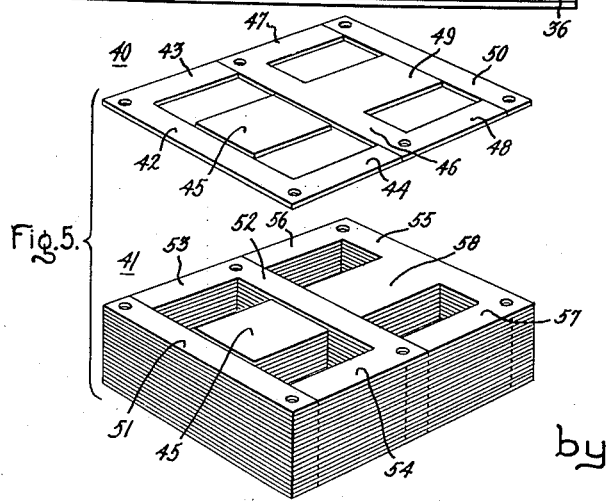
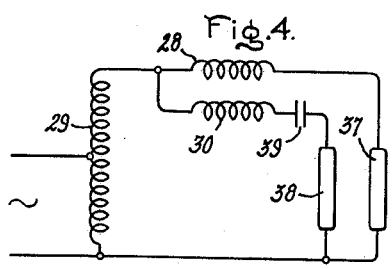
Inventor:
Wayne L. Henderson,
by Ernest H. Britton
His Attorney.

Patented Feb. 2, 1954

2,668,250

UNITED STATES PATENT OFFICE 2,668,250

COMBINED LOW REACTANCE AUTOTRANSFORMER AND BALLAST REACTOR

Wayne L. Henderson, Fort Wayne, Ind., assignor to General Electric Company, a corporation of New York Application January 7, 1950, Serial No. 137,458

7 Claims. (Cl. 307—156)

This invention relates to stationary electrical induction apparatus, and more particularly to magnetic cores for such apparatus.

In the operation of gaseous discharge lamps, such as mercury vapor lamps, it is common to energize the electrodes of the lamp by means of a low reactance autotransformer, and also to have a ballast reactor in series with the lamp in order to limit current flow through the lamp after the arc is struck. Frequently, particularly in heavy-duty applications, the low reactance autotransformer and the ballast reactor which are used are separate and independent units, on separate magnetic cores.

It is an object of this invention to provide a unitary structure in which the autotransformer winding and reactor winding for a gaseous discharge lamp are combined on a single laminated magnetic core.

It is a further object of this invention to provide a new and improved combined low reactance autotransformer and ballast reactor magnetic core structure which will be simple to manufacture, and economical to operate.

In accomplishment of these objectives, this invention provides a simple magnetic core formed of E-shaped, I-shaped, and U-shaped laminations on which the low reactance autotransformer winding and current-limiting reactor for gaseous discharge lamps are both mounted.

In accordance with my invention, a low reactance autotransformer winding and one or more ballast reactor windings are mounted on a single unitary magnetic core structure, with the magnetic core structure being so arranged that the autotransformer winding is magnetically isolated from the reactor windings even though the laminations comprising the autotransformer and reactor core sections are interleaved with respect to one another to mechanically lock the respective core sections together. The magnetic isolation between the autotransformer and reactor windings is accomplished by providing low reluctance magnetic paths between the autotransformer winding and the ballast reactor winding or windings, and also by the use of air gaps in the center leg portions of the respective reactor core sections. Although the magnetic relationships between the low reactance autotransformer winding and the ballast reactor windings remain the same as when these units are mounted on separate magnetic core structures, a more compact structure is obtained by this unitary construction, with a strong interlocking between the autotransformer and reactor core sections being obtained by interleaving between the respective core sections.

The features of this invention which I believe to be novel are set forth with particularity in the appended claims. My invention itself, however, both as to its organization and use, together with further objects and advantages thereof, may best be understood by reference to the following description taken in connection with the accompanying drawing in which Fig. 1 is a perspective view of a magnetic core for a two-lamp combined low reactance autotransformer and ballast reactor in accordance with my invention showing the construction of alternate laminated layers of the core; Fig. 2 is a plan view of the assembled core of Fig. 1, with windings in place; Fig. 3 is an end view of the assembled core shown in Fig. 2; Fig. 4 is a wiring diagram showing the relation of the various windings on the core of Figs. 1–3 to the electrical circuit in which they are placed; while Fig. 5 is a view of a magnetic core for a one-lamp combined low reactance autotransformer and ballast reactor showing the construction of alternate laminated layers of the core.

Referring now to the drawing, there is shown in Fig. 1 an exploded view of the magnetic structure for a two-lamp combined ballast reactor and autotransformer. The magnetic structure is built up of stacked E-shaped, I-shaped, and U-shaped laminations which are assembled in an interleaved relationship, as will be hereinafter more fully described. Each laminated layer is comprised of one E-shaped lamination, one I-shaped lamination, and two U-shaped laminations each having a detached member centrally located between and parallel to the legs of the U.

The topmost laminated layer 1, viewed from left to right in Fig. 1, is comprised of a U-shaped lamination 2, having a detached intermediate member 3 centrally located in the window 4 framed by the end legs 5 and 6 of the U, with intermediate member 3 being parallel to side legs 5 and 6. Legs 5 and 6 of U-shaped lamination 2 are butt-jointed against the back of an E-shaped lamination 7 having an integral center leg 8 and two end legs 9 and 10. Legs 8, 9, and 10 of lamination 7 butt against the back of an E-leg abutting member, that is, a second U-shaped lamination 11 exactly like lamination 2, having two end legs 12 and 13 and a detached intermediate member 14 which is centrally located in the window 15 framed by end legs 12 and 13 of the U, with intermediate member 14 being parallel to end legs 12 and 13. End legs 12 and 13 of U-shaped lamination 11 form a butt joint with I-shaped lamination 19 which completes the laminated layer.

The adjacent alternate layer 17 is essentially the reverse of laminated layer 1 just described. Looking from left to right in Fig. 1, it will be seen that an I-shaped lamination 18 is placed on the end and is butt-jointed to the legs 20 and 21 of U-shaped lamination 19 which has a detached intermediate member 3 centrally located between and parallel to legs 20 and 21. The base of U-shaped lamination 19 is butt-jointed to the end legs 23 and 24 of E-shaped lamination 22 having an attached center leg 8 which lies directly below the corresponding center leg 8 of the laminated layer 1. The main body portion of E-shaped lamination 22 is in turn butt-jointed at the opposite end of the core to the end legs 26 and 27 of U-shaped lamination 25 having a detached intermediate member 14 centrally located between and parallel to end legs 26 and 27. The core structure is built up of alternate laminated layers 1 and 17 until the desired number of layers has been stacked.

It should be noted that the respective intermediate laminated members 3, 8, and 14 of each of the laminated layers lie in directly superposed relation to the corresponding intermediate members of the layers above and below.

In the core shown in Figure 1, which is designed to be used as a two-lamp combined low reactance autotransformer and ballast reactor, the autotransformer winding is placed on core leg 8, and reactor windings are placed on stacked intermediate laminated members 3 and 14, respectively. These windings can be seen in Fig. 2 where reactor coil 28 is shown about laminations 3, autotransformer winding 29 is shown on core leg 8 and reactor winding 30 is shown about laminations 14.

As has been mentioned before, laminations 3 and 14 are not integrally joined to the rest of the magnetic structure, but are detached therefrom in order to increase the magnetic reluctance of the reactor sections of the core. In order to hold these core sections and their connected coils in place, and as best shown in Figs. 2 and 3, a wedge 31 of some non-magnetic material, such as wood, for example, is used on each side of the core structure and runs centrally for the entire length of the core structure between the coils and across the surface of the outermost laminations on each face of the core.

To hold the entire core in tightly assembled relation, angle irons 32, 33, 34 and 35 run the entire length of the core structure and clamp the laminations together at the upper and lower ends of the core, the angle irons being held in place by bolts 36. This clamping arrangement holds the core laminations in tightly assembled relation, with a consequent low vibratory noise level.

A wiring diagram of the two-lamp circuit in which my magnetic core and windings of Figs. 1–3 may be utilized is shown in Fig. 4. One end of autotransformer winding 29 is connected to one end of both reactor windings 28 and 30. These two windings are respectively in series with lamps 37 and 38, with the other end of the lamps being connected to the end of the autotransformer 29 which is not connected to the reactors 28 and 30. A capacitor 39 is shown in series with reactor 30 and lamp 38, in order that lamp 38 may operate with a leading current, thereby increasing the overall power factor of the ballast, and reducing the stroboscopic effect of the cyclic supply voltage on the lamps 37 and 38.

As shown in Fig. 5, the two-lamp core structure shown in Figs. 1 and 2 may be modified in order to provide for only a single lamp by omitting one of the two end core sections leaving only the center core section and one end core section, upon which are mounted the autotransformer coil and one reactor winding, respectively.

Thus, the magnetic core for a one-lamp combined autotransformer and ballast is constructed of alternate laminated layers 40 and 41 as will be described hereinafter. Viewing layer 40 from left to right as shown in Fig. 5, it will be seen that there is provided a U-shaped member 42 having end legs 43 and 44. A detached intermediate member 45 is centrally positioned between and parallel to end legs 43 and 44. End legs 43 and 44 of U-shaped lamination 42 are butt-jointed to the main body portion of E-shaped lamination 46 having end legs 47 and 48 and an integral intermediate leg 49. Legs 47, 48 and 49 of E-shaped lamination 46 are all butt-jointed to an E-leg abutting, I-shaped lamination 50 which forms the right edge of laminated layer 40 as viewed in the drawing.

The adjacent layer 41, looking from left to right in Fig. 5, is comprised of an I-shaped lamination 51 which is butt-jointed to the end legs 53 and 54 of U-shaped lamination 52. Legs 53 and 54 of U-shaped lamination 52 extend in an opposite direction from the base of the U as compared to the legs of the U-shaped lamination 42 of layer 40. An intermediate detached lamination member 45 is centrally positioned between and parallel to legs 53 and 54 of U-shaped member 52.

The main body portion of U-shaped lamination 52 is butt-jointed to the end legs 56 and 57 and the integral center leg 58 of reverse E-shaped lamination 55. Similar to the construction of Figs. 1–3, a reactor winding is placed about the core section comprised of the detached lamination members 45, and an autotransformer winding is placed about the core section comprised of intermediate integral leg members 49 and 58 of lamination layers 40 and 41, respectively.

It will be noted that in accordance with my invention, every joint of the laminated core is formed by interleaved laminations, thereby providing a more rigid and unified core construction than would be obtained if all the laminations of adjacent core sections were butt-jointed along the same cross-sectional line, and also requiring less clamping force than the latter construction.

Furthermore, by consolidation of the low reactance autotransformer and reactor windings on a single magnetic core, I provide a much more compact structure than is obtainable when these windings are mounted on separate cores, as has very often been the case when the low reactance autotransformer and reactor are used in conjunction with heavy-duty gaseous discharge lamps. This compact structure not only results in a space saving, but also in a reduction in the amount of iron used with resulting cost reduction.

Also, the core structure of my invention provides better heat transfer than in the construction using separate cores for autotransformer and reactor windings. By incorporating the autotransformer winding and the reactor winding on the same core structure, the overall temperature rise of the core is reduced by allowing the hot reactor core section to transfer its heat by conduction to the much cooler autotransformer core section.

While I have shown a stacking arrangement in which layers 1 and 17 are alternated, as seen in Fig. 1, or layers 40 and 41 are alternated as shown in Fig. 5, it is obvious that I could also provide two or more layers in each alternation rather than using only one layer for each alternation as shown in the drawing.

While there have been shown and described particular embodiments of my invention, it will be obvious to those skilled in the art that various changes and modifications can be made therein without departing from the invention and, therefore, it is aimed in the appended claims to cover all such changes and modifications as fall within the true spirit and scope of the invention.

What I claim as new and desire to secure by Letters Patent of the United States is:

1. A combined low reactance autotransformer and reactor ballast comprising a first laminated layer having a first U-shaped lamination with two legs perpendicular to an integral connecting portion, said two legs of said first U-shaped lamination abutting the main body portion of a first E-shaped lamination, a detached intermediate member centrally located between and parallel to the legs of said first U-shaped member, the legs of said first E-shaped lamination abutting an E-leg abutting lamination, and a second laminated layer comprising an I-shaped lamination in superposed relation to said connecting portion of said first U-shaped member, a second U-shaped lamination having its legs abutting said I-shaped member, the legs of said second U-shaped lamination lying in superposed relation to the legs of said first U-shaped lamination, the connecting portion of said second U-shaped lamination being in superposed relation to said main body portion of said first E-shaped lamination and a second E-shaped lamination having its legs abutting said second U-shaped lamination, the respective leg members of said second E-shaped lamination being in superposed relation to the corresponding leg members of said first E-shaped lamination, the main body portion of said second E-shaped lamination being in superposed relation to said E-leg abutting member, a second detached intermediate member centrally located between and parallel to the legs of said second U-shaped member, said second intermediate member being in superposed relation to said intermediate member of said first layer, a plurality of said first and second layers being alternately stacked to form a magnetic core, a plurality of superposed detached intermediate members collectively serving as a winding leg, a reactor winding positioned on said winding leg, the respective center leg portions of said plurality of E-shaped members collectively serving as a second winding leg, and an autotransformer winding positioned on said second winding leg.

2. A combined low reactance autotransformer and reactor ballast comprising a first laminated layer having a U-shaped lamination with its legs abutting the main body portion of an E-shaped lamination, a detached intermediate member centrally located between and parallel to the legs of said U-shaped member, the legs of said E-shaped lamination abutting an E-leg abutting lamination, and a second laminated layer comprising an I-shaped lamination, a U-shaped lamination having its legs abutting said I-shaped lamination, and an E-shaped lamination having its legs abutting said U-shaped lamination, the main body portion of the E-shaped lamination of said first layer always being superposed with respect to the connecting portion of said U-shaped lamination of said second layer and a detached intermediate member centrally located between and parallel to the legs of said U-shaped member, said intermediate member being in superposed relation to the detached intermediate member of said first layer, a plurality of said first and second layers being alternately stacked to form a magnetic core, the plurality of superposed detached intermediate members collectively serving as a winding leg, a reactor winding positioned on said winding leg, the respective center leg portion of said plurality of E-shaped members collectively serving as a second winding leg, and an autotransformer winding positioned on said second winding leg.

3. A combined autotransformer and reactor ballast comprising a first laminated layer having a first U-shaped lamination with two legs perpendicular to an integral connecting portion, said legs of said first U-shaped lamination abutting the main body portion of a first E-shaped lamination, the legs of said first E-shaped lamination abutting the integral connecting portion of a second U-shaped lamination, the legs of said second U-shaped lamination abutting an I-shaped lamination, and a second laminated layer comprising a second I-shaped lamination in superposed relation to said connecting portion of said first U-shaped lamination, a third U-shaped lamination having its legs abutting said second I-shaped lamination, a second E-shaped lamination having its legs abutting the connecting portion of said third U-shaped lamination, and a fourth U-shaped lamination having its legs abutting the main body portion of said second E-shaped lamination, the corresponding leg portions of said first and second E-shaped laminations being in superposed relation, the main body portion of said first E-shaped lamination and the connecting portion of said third U-shaped lamination always being in superposed relation, the main body portion of said second E-shaped lamination and the connecting portion of said second U-shaped lamination always being in superposed relation, said first, second, third, and fourth U-shaped laminations each having detached intermediate members centrally located between and parallel to the respective legs of said U-shaped members, the intermediate members of said first and third U-shaped members and said second and fourth U-shaped members being respectively in superposed relation, a plurality of said first and second layers being alternately stacked to form a core, the superposed intermediate members of said first and third U-shaped members collectively serving as a first winding leg, a first reactor winding positioned on said first winding leg, the superposed intermediate members of said second and fourth U-shaped members collectively serving as a second winding leg, a second reactor winding positioned on said second winding leg, the superposed center leg portions of said first and second E-shaped laminations collectively serving as a third winding leg, and an autotransformer winding positioned on said third winding leg.

4. A combined low reactance autotransformer and ballast reactor comprising a first laminated layer having a first U-shaped lamination with two end legs perpendicular to an integral connecting portion, said legs of said U-shaped lamination abutting the main body portion of a first E-shaped lamination, the legs of said first E-shaped lamination abutting a first I-shaped lamination, a second laminated layer comprising a second I-shaped lamination in superposed relation to said connecting portion of said first U-shaped lamination, a second U-shaped lamination having its two end legs abutting said second I-shaped lamination, and a second E-shaped lamination having its legs abutting the connecting portion of said second U-shaped lamination, the corresponding leg portions of said first and second E-shaped laminations being in superposed relation to each other, the main body portion of said first E-shaped lamination always being superposed with respect to the connecting portion of said second U-shaped lamination, each of said U-shaped laminations having a detached intermediate member centrally located between and parallel to the respective legs of said U-shaped laminations, said intermediate members being in superposed relation to each other, a plurality of said first and second layers being stacked to form a magnetic core, the superposed center leg portions of said E-shaped laminations comprising a first winding leg, an autotransformer winding positioned on said first winding leg, said superposed detached intermediate members comprising a second winding leg, and a reactor winding positioned on said second winding leg.

5. In a combined low reactance autotransformer and ballast reactor, a first laminated layer having a first U-shaped lamination with two end legs perpendicular to an integral connecting member, said end legs of said first U-shaped lamination abutting the main body portion of a first E-shaped lamination, said first E-shaped lamination having two end legs and an intermediate leg abutting a first I-shaped lamination, and a second laminated layer comprising a second I-shaped lamination in superposed relation to said connecting member of said first U-shaped lamination, a second U-shaped lamination having two end legs abutting said I-shaped lamination, and a second E-shaped lamination having two end legs and an intermediate leg abutting the connecting member of said second U-shaped lamination, the respective intermediate legs of said first and second E-shaped laminations being in superposed relation, the main body portion of said first E-shaped lamination always being superposed with respect to the connecting portion of said second U-shaped lamination, each of said U-shaped laminations having a detached intermediate member centrally located between and parallel to the respective legs of said U-shaped laminations, said intermediate members being in superposed relation to each other, a plurality of said first and second layers being alternately stacked to form said magnetic core, with electrical windings about the core element comprising said interposed intermediate legs of said first and second E-shaped laminations, and also about the core element comprising the superposed members intermediate the legs of said first and second U-shaped laminations.

6. A combined low reactance autotransformer and ballast reactor comprising a first laminated layer having a first U-shaped lamination, a first E-shaped lamination, and an E-leg abutting lamination, said U-shaped lamination having two end legs perpendicular to an integral connecting portion, with the legs of said first U-shaped lamination abutting the main body portion of said first E-shaped lamination, the legs of said first E-shaped lamination abutting said E-leg abutting lamination, and a second laminated layer having a second U-shaped lamination, a second E-shaped lamination, and an I-shaped lamination, said I-shaped lamination being in superposed relation to said connecting portion of said first U-shaped lamination, the legs of said second U-shaped lamination abutting said I-shaped lamination, the legs of said second E-shaped lamination abutting the connecting portion of said second U-shaped lamination, the corresponding leg portions of each of said E-shaped laminations being in superposed relation to each other, the main body portion of said first E-shaped lamination always being superposed with respect to the connecting portion of said second U-shaped lamination, each of said U-shaped members having a detached intermediate member centrally located between and parallel to the respective legs of said U-shaped members, said intermediate members being in superposed relation to each other, a plurality of said first and second layers being alternately stacked to form a magnetic core, the superposed center leg portions of said E-shaped laminations comprising a first winding leg, an autotransformer winding positioned on said first winding leg, said superposed detached intermediate members comprising a second winding leg, and a reactor winding positioned on said second winding leg.

7. A combined low reactance autotransformer and ballast reactor comprising a first laminated layer having a first and a second U-shaped lamination, a first E-shaped lamination, and a first I-shaped lamination, each of said U-shaped laminations having two legs perpendicular to an integral connecting portion, the legs of said first U-shaped lamination abutting the main body portion of said first E-shaped lamination, the legs of said first E-shaped lamination abutting the connecting portion of said second U-shaped lamination, and the legs of said second U-shaped lamination abutting said I-shaped lamination, and a second laminated layer having a third and a fourth U-shaped lamination, a second E-shaped lamination, and a second I-shaped lamination, said second I-shaped lamination being in superposed relation to said connecting portion of said first U-shaped lamination, with the legs of said third U-shaped lamination abutting said second I-shaped lamination, the legs of said second E-shaped lamination abutting said connecting portion of said third U-shaped lamination, and the legs of said fourth U-shaped lamination abutting the main body portion of said second E-shaped lamination, the main body portion of said first E-shaped lamination and the connecting portion of said third U-shaped lamination always being in superposed relation, the main body portion of said second E-shaped lamination and the connecting portion of said second U-shaped lamination always being in superposed relation, the corresponding legs of said first and second E-shaped laminations being in superposed relation to each other, each of said U-shaped members having a detached intermediate member centrally located between and parallel to the respective legs of said U-shaped members, said detached intermediate members for said first and third U-shaped members and for said second and fourth U-shaped members being respectively in superposed relation, said first and second laminated layers being stacked alternately to form a magnetic core, the superposed center leg portions of said E-shaped laminations comprising a first winding leg, an autotransformer winding positioned on said first winding leg, the superposed intermediate members of said first and third U-shaped members collectively serving as a second winding leg, a first reactor winding positioned on said second winding leg, the superposed intermediate members of said second and fourth U-shaped members collectively serving as a third winding leg, and a second reactor winding positioned on said third winding leg.

WAYNE L. HENDERSON.

References Cited in the file of this patent

UNITED STATES PATENTS

| Number | Name | Date |
|---|---|---|
| 1,895,231 | Pearson et al. | Jan. 24, 1933 |
| 2,351,914 | Boucher et al. | June 20, 1944 |
| 2,382,638 | Keiser et al. | Aug. 14, 1945 |
| 2,425,622 | Kronmiller | Aug. 12, 1947 |
| 2,451,202 | Comstock | Oct. '12, 1948 |
| 2,521,533 | Mittenmaier | Sept. 5, 1950 |